US011958306B2

(12) United States Patent
Zigdon et al.

(10) Patent No.: US 11,958,306 B2
(45) Date of Patent: Apr. 16, 2024

(54) SELECTIVE APPLICATION OF PRIMERS

(71) Applicant: Hewlett-Packard Development Company, L.P., Spring, TX (US)

(72) Inventors: Chen Zigdon, Ness Ziona (IL); Mirit Shitrit, Ness Ziona (IL); Liora Braun, Ness Ziona (IL)

(73) Assignee: Hewlett-Packard Development Company, L.P., Spring, TX (US)

( * ) Notice: Subject to any disclaimer, the term of this patent is extended or adjusted under 35 U.S.C. 154(b) by 126 days.

(21) Appl. No.: 17/628,932

(22) PCT Filed: Sep. 30, 2019

(86) PCT No.: PCT/US2019/053752
§ 371 (c)(1),
(2) Date: Jan. 21, 2022

(87) PCT Pub. No.: WO2021/066785
PCT Pub. Date: Apr. 8, 2021

(65) Prior Publication Data

US 2022/0250402 A1 Aug. 11, 2022

(51) Int. Cl.

| | |
|---|---|
| ***B41M 5/00*** | (2006.01) |
| ***B05D 1/28*** | (2006.01) |
| ***B41M 5/42*** | (2006.01) |

(52) U.S. Cl.
CPC ............. *B41M 5/0017* (2013.01); *B05D 1/28* (2013.01); *B41M 5/423* (2013.01); *B05D 2501/10* (2013.01)

(58) Field of Classification Search
CPC .. B41J 2/2132; B41J 11/0015; B41M 5/0017; B41M 5/423; B41M 5/0011; B41M 5/0047; B05D 2501/10; B05D 1/28
See application file for complete search history.

(56) References Cited

U.S. PATENT DOCUMENTS 4,683,001 A 7/1987 Floyd et al.
4,718,340 A 1/1988 Love
(Continued)

FOREIGN PATENT DOCUMENTS

WO 2015/055437 A1 4/2015
WO 2019/143348 A1 7/2019

OTHER PUBLICATIONS

"Resist Printing". Apr. 30, 2012, Dyeing and Printing, Lesson 10: Printing Method, published by e-Krishi Shiksha, Available online at: http://ecoursesonline.iasri.res.in/mod/page/php?id=113912, 2 pages.
(Continued)

*Primary Examiner* — Jannelle M Lebron

(57) ABSTRACT

In an example of the disclosure, a priming lane and a non-priming lane are identified within an image frame to be printed by a printer. A line of molten wax is applied to the roller. The molten wax when cooled is to form a wax ridge upon the roller. The roller having the formed wax ridge is wetted with the primer. The wetted roller is rotated against the substrate to apply the primer. A first width of the wetted roller that does not include the wax ridge forms the priming lane upon the substrate. A second width of the roller that includes the wax ridge causes the primer to not transfer and thereby forms the non-priming lane upon the substrate.

15 Claims, 6 Drawing Sheets

100

(56) References Cited

U.S. PATENT DOCUMENTS

| | | | | |
|---|---|---|---|---|
| 5,413,806 | A * | 5/1995 | Braun | B05C 1/12 118/712 |
| 8,857,977 | B2 * | 10/2014 | Grant | B41M 5/0011 347/105 |
| 2016/0207038 | A1 | 7/2016 | Vella et al. | |
| 2017/0342284 | A1 | 11/2017 | Samuel et al. | |
| 2018/0163086 | A1 | 6/2018 | Crombie et al. | |
| 2019/0224985 | A1 | 7/2019 | Greger et al. | |

OTHER PUBLICATIONS

Gaspar et. al.; "Inkjet Printed Silver Electrodes on macroporous paper for a paper-based isoelectric focusing device" (Dec. 28, 2016) Biomicrofluidics, 10, No. 6: pp. 064120-1-064120-10.

* cited by examiner

SELECTIVE APPLICATION OF PRIMERS

BACKGROUND

A print system may apply print agents to a paper or another substrate to produce an image on the substrate. One example of a print system is a web-fed print system, wherein a printing element is to apply the print agent to a web substrate that is fed to the print system by a substrate roll feeder/take-up system. In another example, the print system is a sheet-fed print system, wherein a printing element is to apply the print agent to a substrate sheet that is fed to the print system utilizing a conveyor and/or impression drum.

In certain examples, a digital print system may apply to the substrate via digital Liquid Electrophotographic Printing ("LEP") printing processes an ink print agent that is an electrostatic printing fluid (e.g., electrostatically chargeable toner or resin colorant particles dispersed or suspended in a carrier fluid). In other examples, a digital print system may apply a liquid ink print agent to a substrate via inkjet printing, or apply a dry toner print agent to a substrate via a laser printing technology.

DRAWINGS

DETAILED DESCRIPTION

Figure 1:
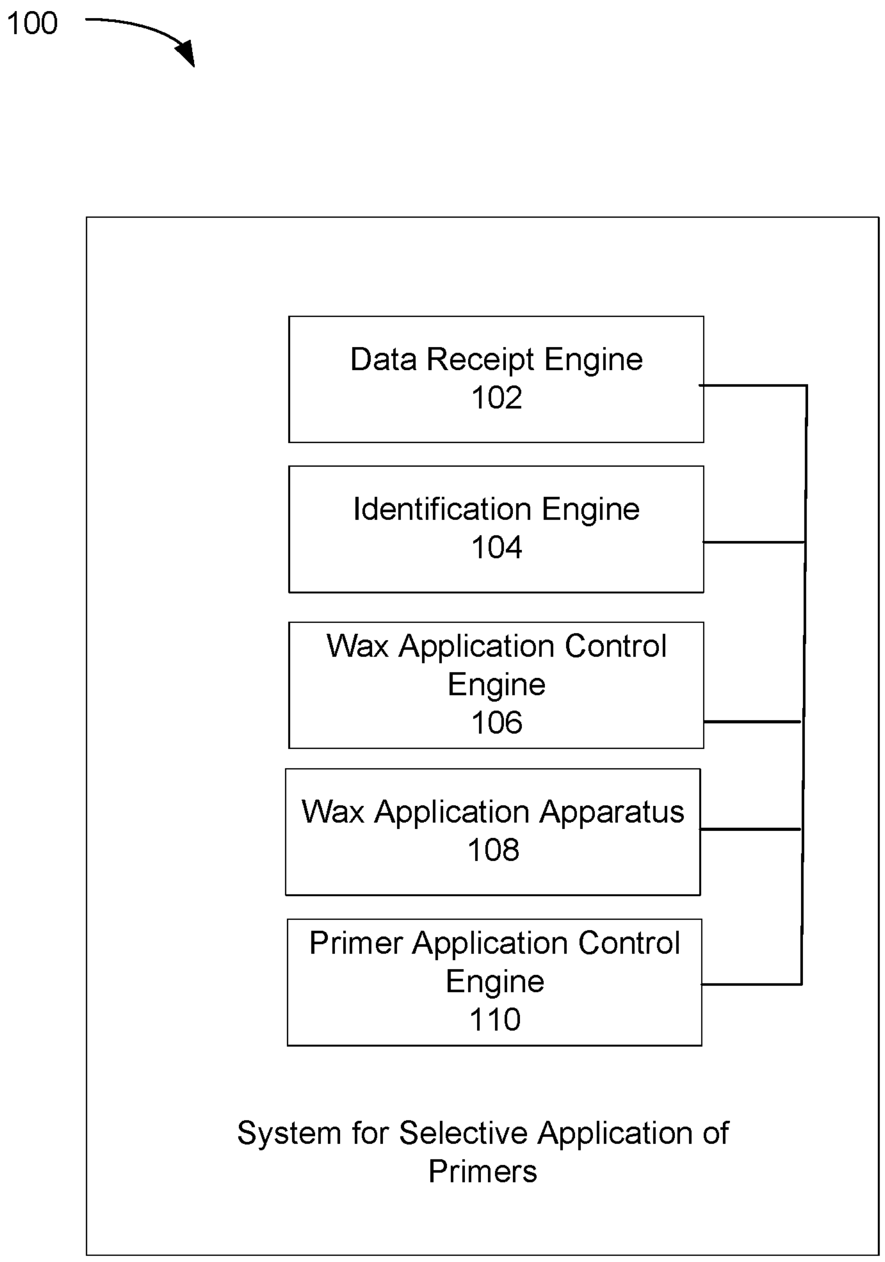
FIG. 1 illustrates an example of a system for selective application of primers.

When performing digital printing with liquid print agent, especially on synthetic substrates, there is often a need to apply a primer substance over the substrate in order to achieve better bonding of the ink to the substrate. For example, in LEP printing it is often advantageous to apply a water-based solution primer to the entire surface ("flood coating") of a polymeric substrate before applying ink in printing process to enable effective adhesion of ink to the substrate. The substrate passes through a primer flood coating system and is coated with the primer substance. Often such primer application is performed "inline" at the printer wherein the ink coating components are upstream of the ink application components, with the ink application components to print an image upon the substrate after the primer has sufficiently dried. Primer can be applied on the substrate using several methods, including gravure coating, a gravure kiss, and flexographic coating. In each of these cases primer is applied with a roller, e.g, an anilox roller, having an engraved cavities or cells structure. The amount of the primer solution transferred to the substrate is determined by the presence and availability of the roller cavities or cells.

However, in some applications it becomes necessary to prime a substrate in a manner such that not all of the substrate is flooded with primer. For instance, with certain packaging applications it is advantageous to leave a portion of the substrate unprimed and without an application of ink. In this example, the unprimed and unprinted portion may be to subsequently receive an adhesive substance, the adhesive substance to assist in forming a container from a folded portion of the substrate. Currently available solutions for effecting such partial priming, e.g., with certain gravure and flexographic priming methods, utilize anilox rollers with specific patterns to match each job and application. This need for multiple rollers can be expensive in terms of cost of rolls, set-up time, and work space/storage requirements.

To address these issues, various examples described in more detail below provide a system and a method that enable selective application of primer to a substrate. In an example, an image frame to be printed by a printer is analyzed to identify a priming lane where a primer is to be applied to a substrate by a roller, and a non-priming lane where the primer is not to be applied to the substrate. In examples, data indicative of composition and/or attributes of the image frame is received, and the priming lane and non-priming lanes are identified based upon the received image frame data. The width of the priming lane is to correlate with a width of an image to be printed by the printer within the frame. The non-priming lane is to correlate with a width of the frame where ink is not to be applied by the printer. A line or streak of molten wax is to be applied to the roller, e.g., by utilizing by heating a tip of a solid wax element and causing the heated wax tip to touch the roller so as to form the wax ridge, or by utilizing an inkjet printhead to apply a melted wax. The wax when cooled forms a wax ridge upon the roller. The roller with the wax ridge is in turn wetted with primer. The wetted roller is rotated against the substrate to apply the primer. The first width of the wetted roller that does not include the wax ridge forms the priming lane upon the substrate. The second width of the wetted roller that includes the wax ridge causes the primer to not transfer to the roller and thereby not to be transferred to the substrate, and thereby forms the non-priming lane upon the substrate.

In this manner the disclosed system and method enable formation of a wax ridge upon a roller to achieve well-defined and accurate priming and non-priming lanes upon a substrate. The wax ridge that is applied to the roller can be easily removed and applied again to achieve variable positions of priming and non-priming lane types according to specific requirements and widths associated with print jobs. The wax ridge formed upon the roller can be removed by cleaning and then a narrower, wider, thinner, or thicker wax ridge can be applied to the roller per the next print job's requirements. This allows for changes on a single roll of lane priming for a set of distinct image frames and reduces or eliminates the need to maintain a large set of anilox rollers various print applications. The disclosed solution is applicable for any anilox roller-based system as gravure (direct or non-direct) or flexographic application mode. Users will appreciate the flexibility, ease of use, and lower expenses enabled by the disclosed selective application of primers, and installations and utilization of printing systems incorporating this disclosure should thus increase.

FIGS. 1, 2, and 3A-3D depict examples of physical and logical components for implementing various examples. In FIG. 1 various components are identified as engines 102-106 and 110. In describing engines 102-106 and 110 focus is on each engine's designated function. However, the term engine, as used herein, refers generally to hardware and/or programming to perform a designated function. As is illustrated later with respect to FIG. 2, the hardware of each engine, for example, may include one or both of a processor and a memory, while the programming may be code stored on that memory and executable by the processor to perform the designated function.

FIG. 1 illustrates an example of a system 100 for selective application of primers of a substrate. In this example, system 100 includes a data receipt engine 202, an identification engine 104, a wax application control engine 106, and wax application control apparatus 108, and a primer application control engine 110. In performing their functions, engines 102-106 and 110 may access a data repository, e.g., a memory accessible to system 100 that can be used to store and retrieve data.

In the example of FIG. 1, data receipt engine 102 represents generally any combination of hardware and programming that is to receive data indicative of an image frame from a print job, the image frame to be printed upon a substrate by a printer. As used herein, an "image frame" is used synonymously with an "image plot" refers to an image to be printed upon a substrate. As used herein, an "image" refers to a rendering of an object, scene, person, or an abstraction such text or a geometric shape. In examples the image may include a primary image, a background image, a coded image, and/or a fiducial image. In examples the image frame may be received in a raster or vector format. In examples, the image frame may be in a compressed or an uncompressed format. Examples of possible formats for the image frame include JPG (Joint Photographic Experts Group), TIFF (Tagged-Image File Format), BMP (Windows Bitmap), PNG (Portable network Graphics), EPS Encapsulated Post-Script), PDF (Portable Document Format), and PS (PostScript).

As used herein, "printer" and "printing device" are used synonymously and refer generally to any electronic device or group of electronic devices that consume a print agent (e.g., an ink) to produce a printed print job or printed content. In examples, a printer may be, but is not limited to, a liquid inkjet printer, a liquid toner-based printer, a LEP printer that utilizes electrostatic printing fluid and a blanket, or a dry toner printing device. The term "printer" includes a multifunctional device that performs a function such as scanning and/or copying in addition to printing.

Continuing with the example of FIG. 1, system 100 includes an identification engine 104. Identification engine 104 represents generally any combination of hardware and programming that is to identify, based upon the image frame data, a priming lane within the image frame. As used herein, a "priming lane" refers generally to a lane traversing the length of an image frame wherein a primer is to be applied to the substrate by a roller. In an example, the priming lane correlates with a length of an image to be printed by the printer within the image frame. As used herein a "non-priming lane" refers generally to a lane traversing the length of an image frame wherein a primer not to be applied to the substrate. In an example, the non-priming lane correlates with a length of the frame where ink is not to be applied by the printer, e.g. a length where a folding or adhesive process is to occur after printing such that having ink at this length is not needed or would affect the quality of the post-printing operation.

As used herein, a "roller" refers generally to a cylinder that is to rotate around a central axis. In examples, a roller may be formed from a plastic, a rubber-based substance, a metal, or any other durable material formed in a cylindrical shape with a surface for interfacing with a media. In an example, the roller may be an anilox roller. In examples, an anilox roller may be a cylinder, often constructed of a steel or aluminum core is coated by an industrial ceramic. In examples an anilox roller may include a surface with very fine dimples or cells for receiving a coating of a liquid and transferring the liquid to another surface, e.g, a substrate.

Continuing with the example of FIG. 1, system 100 includes wax application control engine 106. Wax application control engine 106 represents generally any combination of hardware and programming that is to cause a wax application apparatus 108 to apply a line or streak of molten wax upon the roller. As used herein, "wax" refers generally to a compound that is a hydrophobic and is a malleable solid at or near ambient temperatures. In examples, a wax may be a higher alkane or lipid. In examples, a wax may have a melting point above about 40° C. (104° F.). In a specific example, the wax may be solid at room temperature and have a melting point >60° C. and <120° C. In examples, a wax is insoluble in water, but soluble in organic, nonpolar solvents. Organic waxes of different types may be produced by plants and animals. In other examples, waxes may be derived from petroleum, e.g. a paraffin, or a manufactured polyethylene or polyethylene derivative. Waxes other than those specifically named in this paragraph exist and are contemplated by this disclosure.

In an example, wax application control apparatus 108 may be or include a printhead or a set of printheads. Wax application control engine 106 may cause the printhead or printheads to jet the wax upon the roller as the roller is rotated about its axis. As used herein, a "printhead" refers generally to a mechanism for ejection of a liquid, e.g., a print agent. Examples of printheads are drop on demand printheads, such as piezoelectric printheads and thermo resistive printheads, Some printheads may be part of a cartridge which also stores the liquid to be dispensed. Other printheads are standalone and are supplied with liquid by an off-axis liquid supply. As used herein, "print agent" refers generally to any substance that can be applied upon a substrate by a printer during a printing operation, including but not limited to inks, primers and overcoat materials (such as a varnish), water, and solvents other than water. As used herein an "ink" refers generally to a liquid that is to be applied to a substrate during a printing operation to form an image upon the substrate. In examples of the disclosure, a printhead may be used to jet a molten wax upon a roller to form a wax ridge upon the roller. As used herein, a primer refers generally to a substance that is applied to a substrate as a preparatory coating in advance of an application of ink or another image-forming print agent to a substrate.

In another example, wax application control apparatus 108 may include a wax application tip and a heating element. Wax application control element 106 may cause the tip of a solid wax element to be heated, and in turn cause the heated wax tip to touch the roller apply the line or streak of wax to the perimeter of the roller. In an example, the heated wax tip is to apply the molten wax to the roller as the roller is rotated about its axis. In a particular example, wax application apparatus 108 may include holding element to hold a solid wax tip held stationary. In this particular example wax application control engine 106 may cause the roller to rotate against the wax tip to form the line or streak of was along the perimeter of the roller.

The line or streak of molten wax (whether applied to the surface of the roller by a printhead, by touching a heated solid wax element to the roller, by dripping the wax upon the roller, or otherwise) is to cool to a solid state and thereby form a wax ridge upon the roller. In examples, the wax ridge when formed fills cavities or cells in the porous surface of the roller. In examples, the line or streak is to be applied to the roller such that the line or streak extends across the perimeter of the roller at a right angle to the edge of the roller. In an example, the length of the line or streak can be determined based upon the length of the non-priming lane to appear in the image frame when the image frame is printed upon the substrate.

Continuing with the example of FIG. 1, system 100 may include a primer application control engine 110. Primer application control engine 106 represents generally any combination of hardware and programming that is to apply the primer to the roller having the formed wax ridge. In an example, primer application control engine 106 may cause the primer to be applied to the roller by an immersion of the roller in a container filled with primer as the roller is rotated about its axis. In another example, the primer may be caused to be applied to the roller by spraying or dripping the primer onto the roller as the roller is rotated about its axis, such that the roller's cells fill with the fluid except for where the line of molten wax has formed the wax ridge.

Primer application control engine 110 is to in turn cause application of the primer to the substrate by rotating the roller against the substrate to form a priming lane and a non-priming lane upon the substrate. The priming lane is formed upon the substrate using a width of the roller that does not include the formed wax ridge. Cavities or cells in the porous surface of the roller hold the primer at the roller and transfer the primer from the roller to the substrate. The non-priming lane is formed upon the substrate as the wax ridge causes the primer to not transfer to the substrate. The primer does not transfer from the roller to the substrate as the wax ridge that was formed upon the roller filled cavities in the porous surface of the roller that would otherwise have held and transferred liquid primer.

In an example, after a roller with an applied wax ridge is utilized to apply a primer to a substrate, primer application control engine 110 may cause the roller to be cleaned to prepare the roller for a second use. In an example, after cleaning the roller a second line of molten wax is applied to the roller to form a new wax ridge. The new wax ridge is for selective priming of the substrate where a second image frame is to be printed. In a particular example, the roller is cleaned to remove the wax ridge utilizing an ultrasonic cleaning device and a cleaning solution with a PH greater than 7. This process for cleaning and reusing an adjustable anilox roller allows for efficient and economical lane priming of multiple distinct image frames, without a need for maintaining, and making changes between, a set of primer application rollers.

In the foregoing discussion of FIG. 1, engines 102-106 and 110 were described as combinations of hardware and programming. Engines 102-106 and 110 may be implemented in a number of fashions. Looking at FIG. 2 the programming may be processor executable instructions stored on a tangible memory resource 230 and the hardware may include a processing resource 240 for executing those instructions. Thus, memory resource 230 can be said to store program instructions that when executed by processing resource 240 implement system 100 of FIG. 1.

Memory resource 230 represents generally any number of memory components capable of storing instructions that can be executed by processing resource 240. Memory resource 230 is non-transitory in the sense that it does not encompass a transitory signal but instead is made up of a memory component or memory components to store the relevant instructions. Memory resource 230 may be implemented in a single device or distributed across devices. Likewise, processing resource 240 represents any number of processors capable of executing instructions stored by memory resource 230. Processing resource 240 may be integrated in a single device or distributed across devices. Further, memory resource 230 may be fully or partially integrated in the same device as processing resource 240, or it may be separate but accessible to that device and processing resource 240.

In one example, the program instructions can be part of an installation package that when installed can be executed by processing resource 240 to implement system 100. In this case, memory resource 230 may be a portable medium such as a CD, DVD, or flash drive or a memory maintained by a server from which the installation package can be downloaded and installed. In another example, the program instructions may be part of an application or applications already installed. Here, memory resource 230 can include integrated memory such as a hard drive, solid state drive, or the like.

Figure 2:
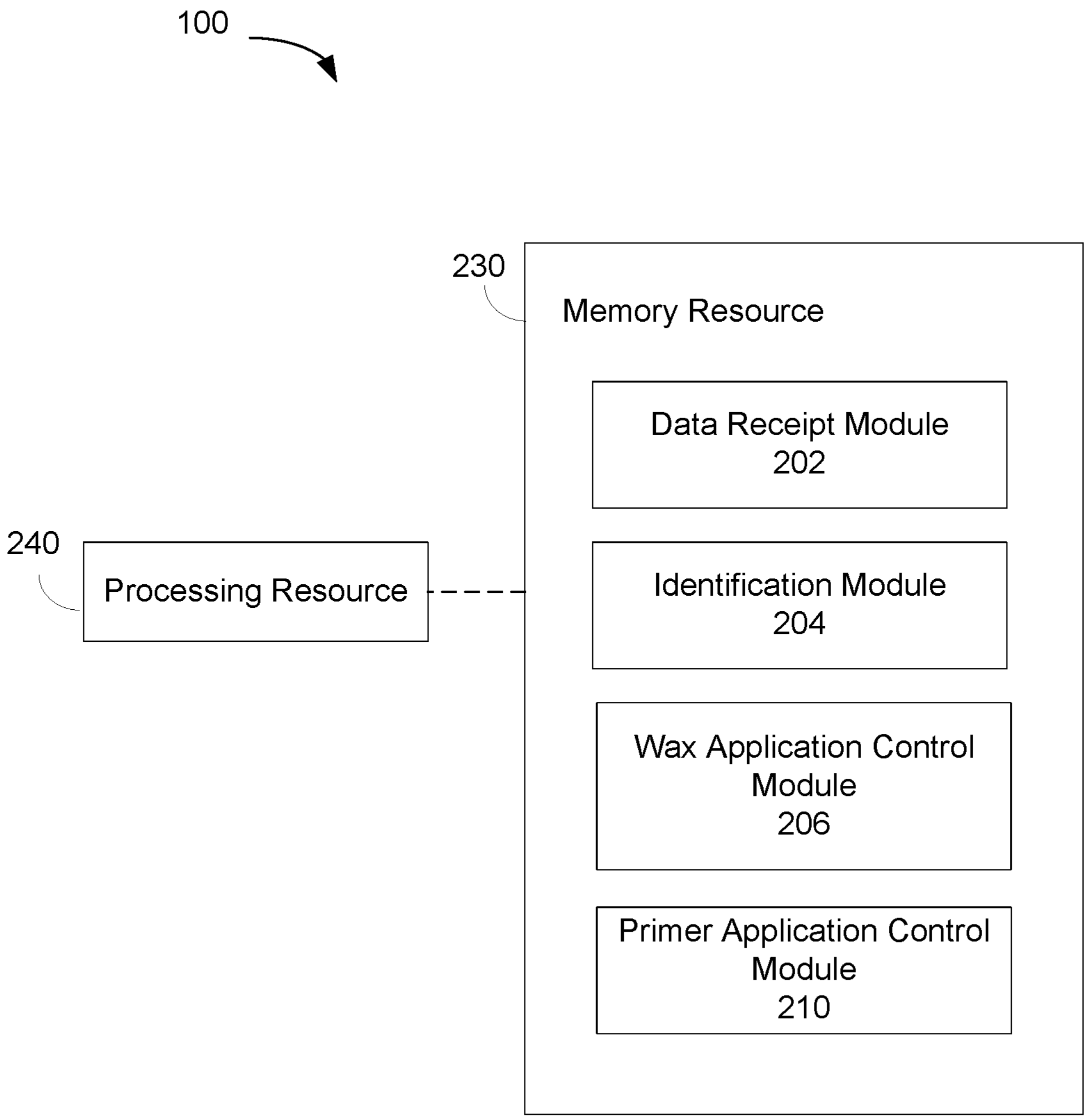
FIG. 2 is a block diagram depicting a memory resource and a processing resource to implement an example of a method for selective application of primers.

In FIG. 2, the executable program instructions stored in memory resource 230 are depicted as data receipt module 202, identification module 204, wax application control module 206, and primer application control module 210. Data receipt module 202 represents program instructions that when executed by processing resource 240 may perform any of the functionalities described above in relation to data receipt engine 102 of FIG. 1. Identification module 204 represents program instructions that when executed by processing resource 240 may perform any of the functionalities described above in relation to identification engine 104 of FIG. 1. Wax application control module 206 represents program instructions that when executed by processing resource 240 may perform any of the functionalities described above in relation to wax application control engine 106 of FIG. 1. Primer application control module 210 represents program instructions that when executed by processing resource 240 may perform any of the functionalities described above in relation to primer application control engine 110 of FIG. 1.

FIGS. 3A-3D illustrate an example of a system 100 to prepare a roller for selective application of primer to a substrate. Beginning at FIG. 3A, system 100 includes a controller 302 and a wax application apparatus 308, Controller 302 represents generally any combination of hardware and programming that is to control the preparation of a roller for selective application of primer, including controlling wax application apparatus 308. In examples, controller 240 may perform some or all the operations of data receipt engine 102 (FIG. 1), identification engine 104 (FIG. 1), wax application control engine 106 (FIG. 1) and/or primer application control engine 110 (FIG. 1).

In an example, controller 302 is to receive print job data 304 indicative of an image frame to be printed upon a substrate by a printer. Controller 302 is to identify, based upon the received print job data 304, a priming lane where a primer is to be applied to the substrate by a primer roller 306. Controller 302 is also to identify based upon the print job data 304 a non-priming lane within the image frame wherein the primer is not to be applied to the substrate.

Figure 3C:
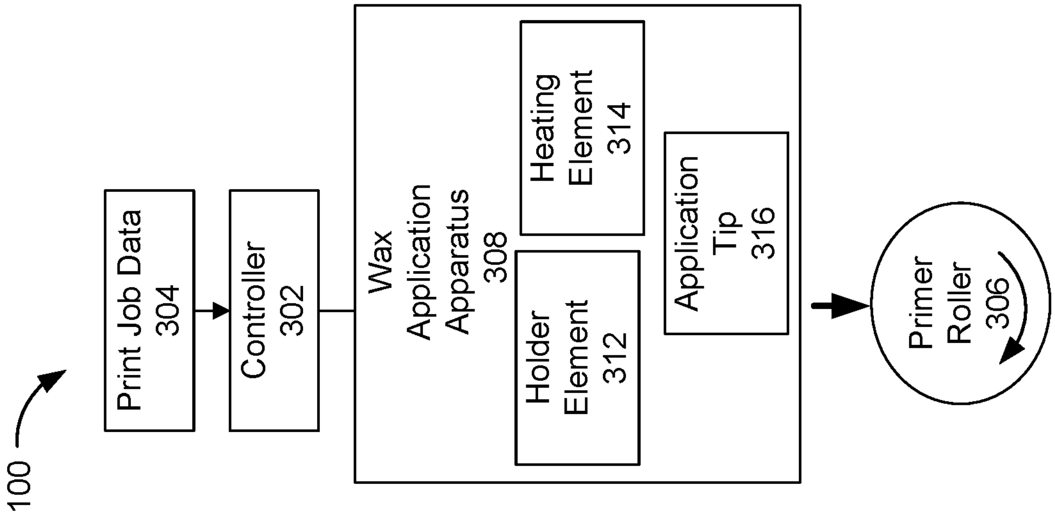
FIGS. 3A-3D illustrate an example of a system to prepare a roller for selective application of primer to a substrate.
Figure 3B:
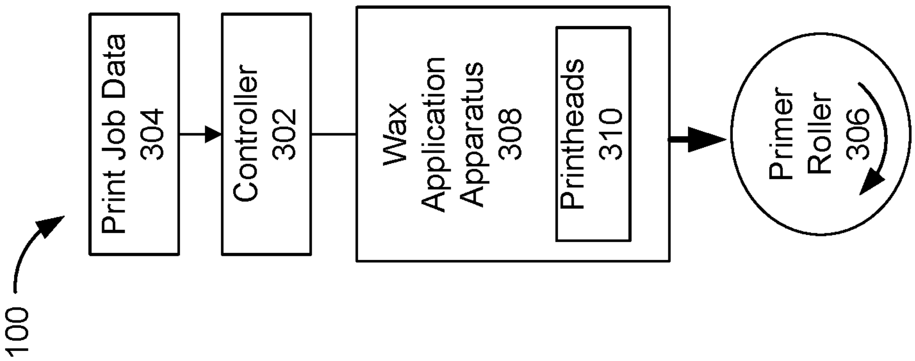
Figure 3A:
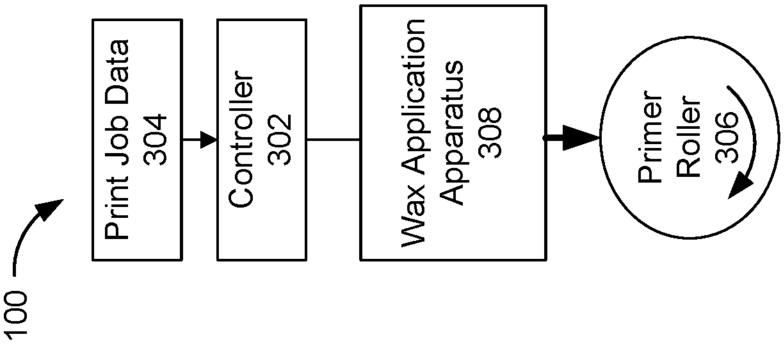
Figure 3D:
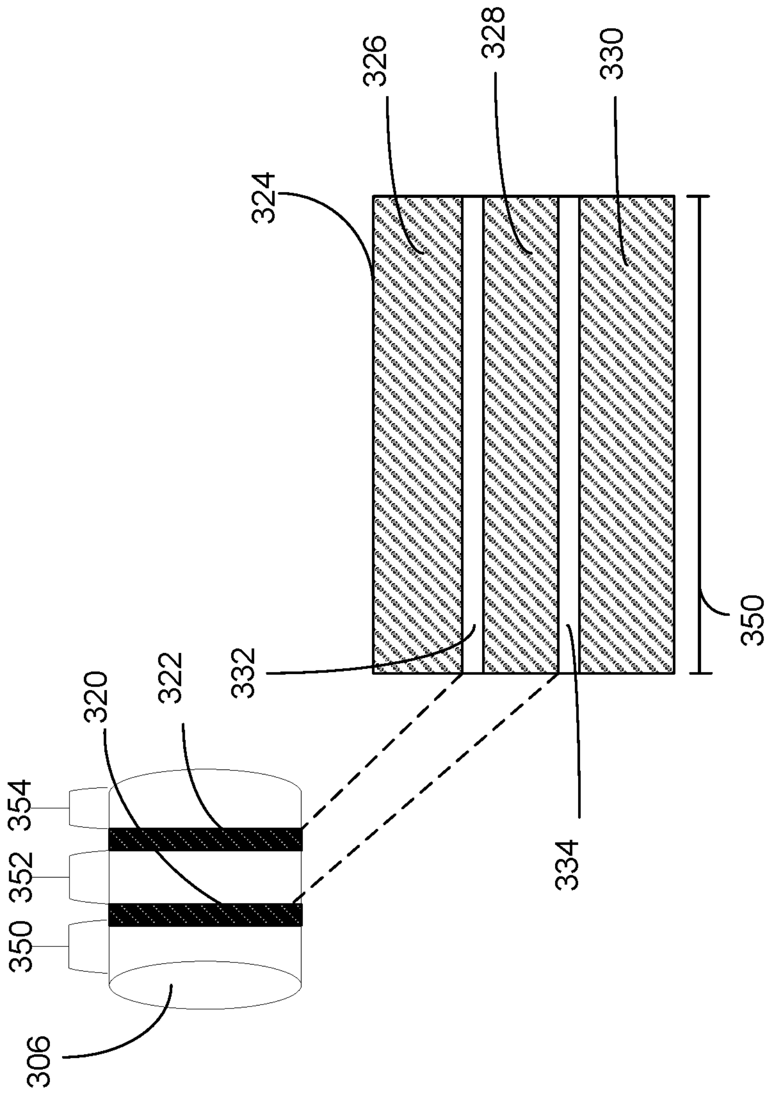

Continuing at FIG. 3D, controller 302 is to control wax application apparatus 308 to apply a line or streak of molten wax to primer roller 306 in consideration of the data. In particular, the line or streak of molten wax is to be applied to primer roller 306 in consideration of the priming lane and non-priming lanes identified from the received print job data 304. The molten wax when cooled is to form a wax ridge upon the roller. The wax ridge is formed in a position such that a width of the primer roller 306 that does not include the wax ridge will be used to create the priming lane when the image frame is printed upon the substrate. The wax ridge is formed on the primer roller 306 in a position such that primer will not be transferred to the substrate in the identified non-priming lane when the image frame is printed upon the substrate. In an example, controller 302 is to control the wax application apparatus 308 to apply the molten wax to the primer roller 306 as the roller is rotated about its axis.

Moving to FIG. 3B, in a particular example wax application apparatus 308 includes a set of printheads. In this example, controller 302 is to control printheads 408 to jet the wax upon the roller to form the line or streak of wax as the roller is rotated about its axis.

Moving to FIG. 3C, in a particular example wax application apparatus 308 includes a solid wax holder element 312, a wax application tip 316, and a heating element 314. In this example, controller 302 is to control wax application apparatus 308 to cause heating element 314 to heat a solid wax element held by holder element 312 and cause the wax application tip 316 to touch the primer roller 306 so as to form the wax ridge. In an example, controller 302 is to cause the wax application tip 316 to touch the primer roller 306 and apply a line or streak of wax to the roller as the roller is rotated about its axis.

FIG. 3D provides an example of a primer roller 306 that has had a first wax ridge 320 and a second wax ridge 322 applied to the roller's perimeter by wax application apparatus 308. In the example of FIG. 3D, the primer roller is being used in a priming operation to apply primer to a substrate 324 in a first priming lane 326, a second priming lane 328, and a third priming lane 330, and not apply primer in a first non-priming lane 332 and a second non-priming lane 334. The primer is applied to the substrate 324 by rotating the primer roller 306 against the substrate. The first, second, and third priming lanes 326 328 330 are formed upon a length 350 of the substrate using widths of the primer roller 306 that do not include the formed wax ridges. The first and second non-priming lanes 332 334 are formed upon the length 350 of substrate as the first and second wax ridges 320 322 have hydrophobic properties that cause the primer to not transfer to the roller and thereby not to transfer to the substrate 324 in the first and second non-priming lanes.

Figure 4:
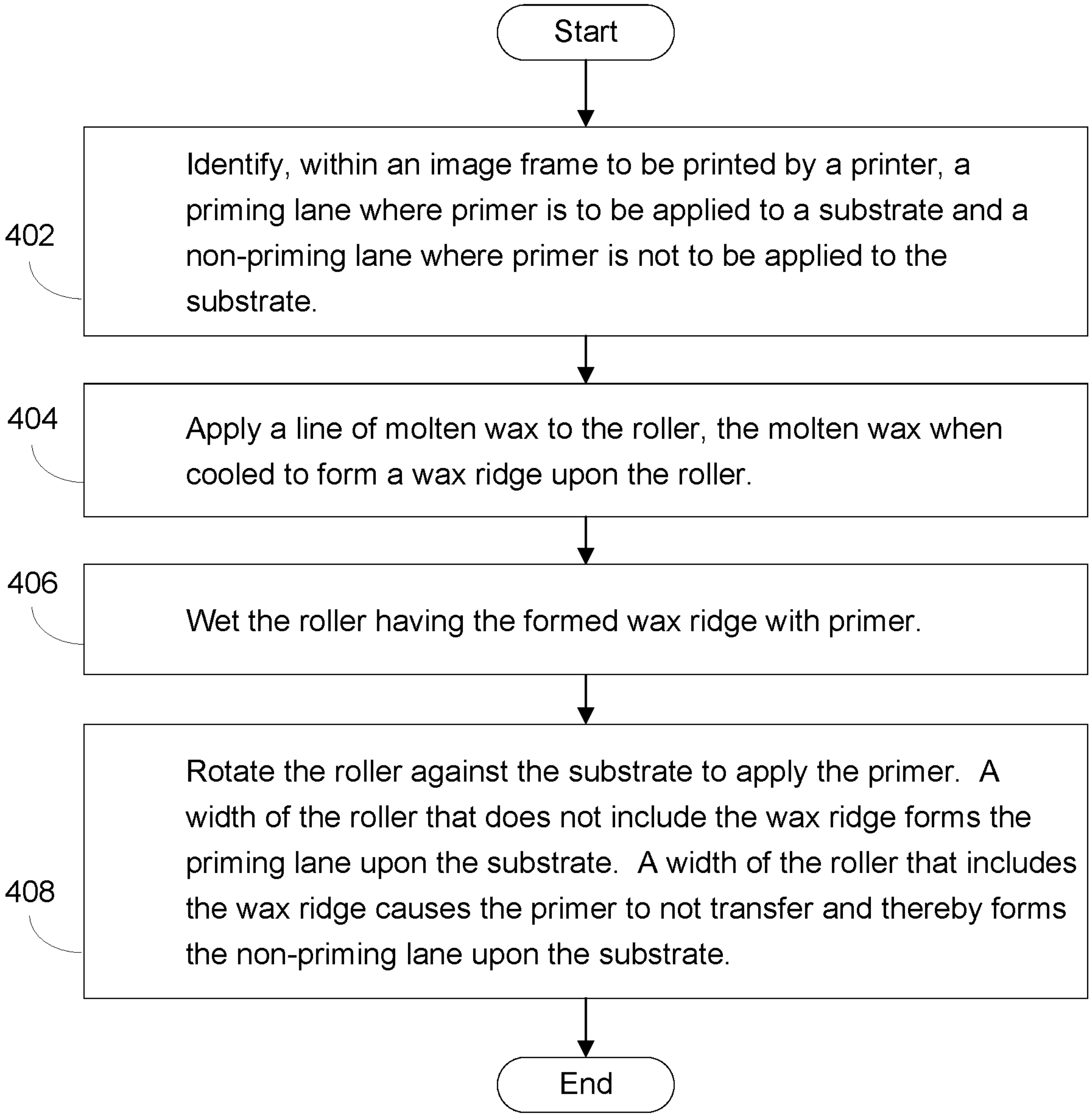
FIG. 4 is a flow diagram depicting an example implementation of a method of selective application of primers.

FIG. 4 is a flow diagram of implementation of a method selective application of primers of a substrate during printing. In discussing FIG. 4, reference may be made to the components depicted in FIGS. 1 and 2. Such reference is made to provide contextual examples and not to limit the manner in which the method depicted by FIG. 4 may be implemented. A priming lane and a non-priming lane are identified within an image frame to be printed by a printer. The priming lane is where a primer is to be applied to a substrate and the non-priming lane where the primer is not to be applied to the substrate (block 402). Referring back to FIGS. 1 and 2, identification engine 104 (FIG. 1) or identification module 204 (FIG. 2), when executed by processing resource 240, may be responsible for implementing block 402.

A line of molten wax is applied to the roller. The molten wax when cooled is to form a wax ridge upon the roller (block 404). Referring back to FIGS. 1 and 2, wax application control engine 106 (FIG. 1) or wax application control module 206 (FIG. 2), when executed by processing resource 240, may be responsible for implementing block 404.

The roller having the formed wax ridge is wetted with primer (block 406). Referring back to FIGS. 1 and 2, primer application control engine 110 (FIG. 1) or wax application control module 210 (FIG. 2), when executed by processing resource 240, may be responsible for implementing block 406.

The wetted roller is rotated against the substrate to apply the primer. A width of the wetted roller that does not include the wax ridge forms the priming lane upon the substrate. A width of the roller that includes the wax ridge causes the roller not to be wetted by the primer, primer not transfer and thereby forms the non-priming lane upon the substrate (block 408). Referring back to FIGS. 1 and 2, primer application control engine 110 (FIG. 1) or wax application control module 210 (FIG. 2), when executed by processing resource 240, may be responsible for implementing block 408.

Figure 5:
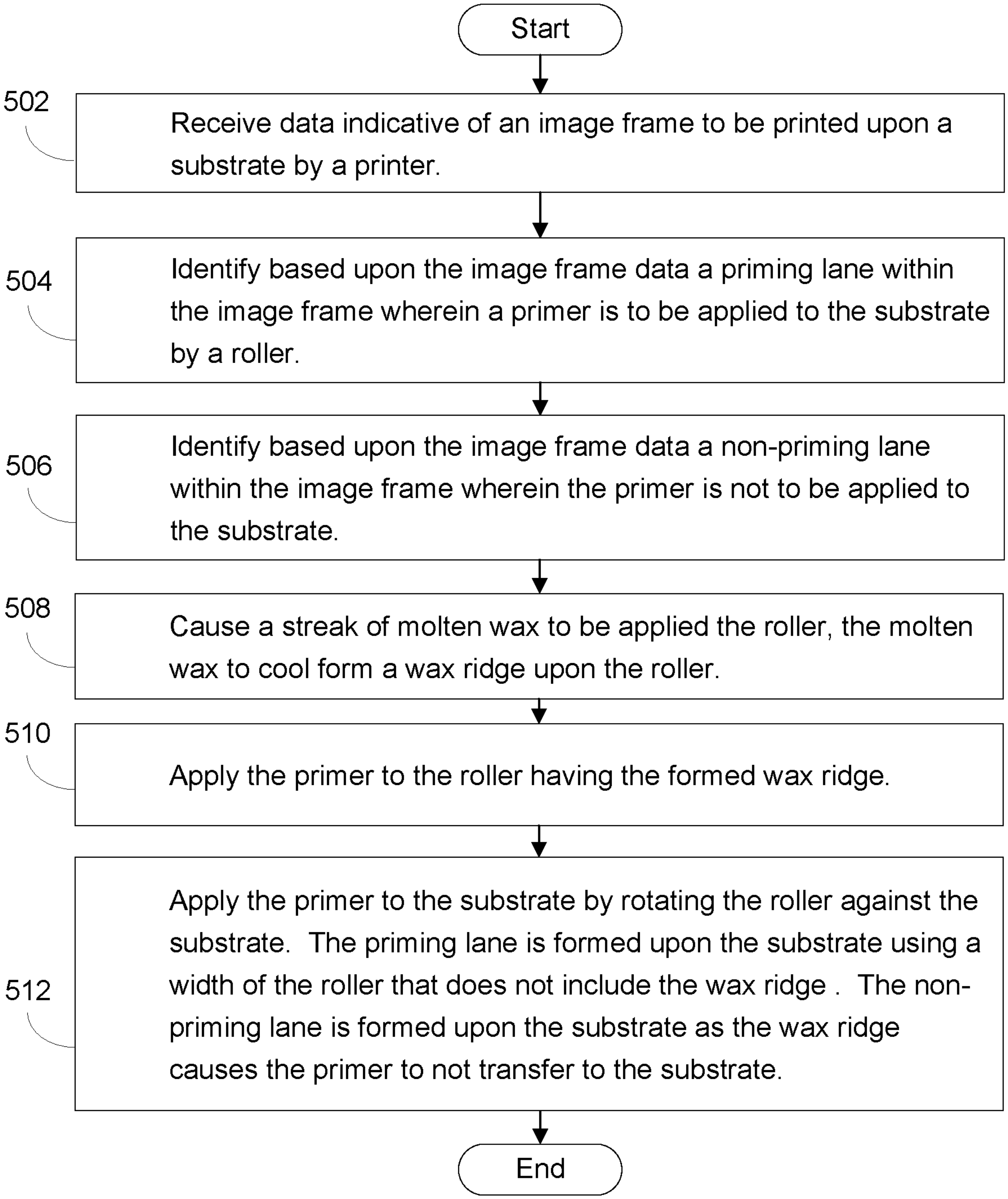
FIG. 5 is a flow diagram depicting another example implementation of a method of selective application of primers.

FIG. 5 is a flow diagram of implementation of a method selective application of primers of a substrate during printing. In discussing FIG. 5, reference may be made to the components depicted in FIGS. 1 and 2. Such reference is made to provide contextual examples and not to limit the manner in which the method depicted by FIG. 5 may be implemented. Data indicative of an image frame to be printed upon a substrate by a printer is received (block 502). Referring back to FIGS. 1 and 2, data receipt engine 102 (FIG. 1) or data receipt module 202 (FIG. 2), when executed by processing resource 240, may be responsible for implementing block 502.

A priming lane within the image frame, wherein a primer is to be applied to the substrate by a roller, is identified based upon the image frame data (block 504). Referring back to FIGS. 1 and 2, identification engine 104 (FIG. 1) or identification module 204 (FIG. 2), when executed by processing resource 240, may be responsible for implementing block 504.

A non-priming lane within the image frame wherein the primer is not to be applied to the substrate is identified based upon the image frame data (block 506). Referring back to FIGS. 1 and 2, identification engine 104 (FIG. 1) or identification module 204 (FIG. 2), when executed by processing resource 240, may be responsible for implementing block 506.

A streak of molten wax is caused to be applied the roller. The molten wax is to cool to form a wax ridge upon the roller (block 508). Referring back to FIGS. 1 and 2, wax application control engine 106 (FIG. 1) or wax application control module 206 (FIG. 2), when executed by processing resource 240, may be responsible for implementing block 508.

The primer is applied to the roller having the formed wax ridge (block 510). Referring back to FIGS. 1 and 2, primer application control engine 110 (FIG. 1) or primer application control module 210 (FIG. 2), when executed by processing resource 240, may be responsible for implementing block 510.

The primer is applied to the substrate by rotating the roller against the substrate. The priming lane is formed upon the substrate using a width of the roller that does not include the wax ridge forms. The non-priming lane is formed upon the substrate as the wax ridge causes the primer to not transfer to the roller and thereby not to transfer to the substrate (block 512). Referring back to FIGS. 1 and 2, primer application control engine 110 (FIG. 1) or primer application control module 210 (FIG. 2), when executed by processing resource 240, may be responsible for implementing block 512.

FIGS. 1-5 aid in depicting the architecture, functionality, and operation of various examples. In particular, FIGS. 1, 2, and 3A-3D depict various physical and logical components. Various components are defined at least in part as programs or programming. Each such component, portion thereof, or various combinations thereof may represent in whole or in part a module, segment, or portion of code that comprises executable instructions to implement any specified logical function(s). Each component or various combinations thereof may represent a circuit or a number of interconnected circuits to implement the specified logical function(s). Examples can be realized in a memory resource for use by or in connection with a processing resource. A "processing resource" is an instruction execution system such as a computer/processor-based system or an ASIC (Application Specific Integrated Circuit) or other system that can fetch or obtain instructions and data from computer-readable media and execute the instructions contained therein. A "memory resource" is a non-transitory storage media that can contain, store, or maintain programs and data for use by or in connection with the instruction execution system. The term "non-transitory" is used only to clarify that the term media, as used herein, does not encompass a signal. Thus, the memory resource can comprise a physical media such as, for example, electronic, magnetic, optical, electromagnetic, or semiconductor media. More specific examples of suitable computer-readable media include, but are not limited to, hard drives, solid state drives, random access memory (RAM), read-only memory (ROM), erasable programmable read-only memory (EPROM), flash drives, and portable compact discs.

Although the flow diagrams of FIGS. 4 and 5 show specific orders of execution, the order of execution may differ from that which is depicted. For example, the order of execution of two or more blocks or arrows may be scrambled relative to the order shown. Also, two or more blocks shown in succession may be executed concurrently or with partial concurrence. Such variations are within the scope of the present disclosure.

It is appreciated that the previous description of the disclosed examples is provided to enable any person skilled in the art to make or use the present disclosure. Various modifications to these examples will be readily apparent to those skilled in the art, and the generic principles defined herein may be applied to other examples without departing from the spirit or scope of the disclosure. Thus, the present disclosure is not intended to be limited to the examples shown herein but is to be accorded the widest scope consistent with the principles and novel features disclosed herein. All of the features disclosed in this specification (including any accompanying claims, abstract and drawings), and/or all of the blocks or stages of any method or process so disclosed, may be combined in any combination, except combinations where at least some of such features, blocks and/or stages are mutually exclusive. The terms "first", "second", "third" and so on in the claims merely distinguish different elements and, unless otherwise stated, are not to be specifically associated with a particular order or particular numbering of elements in the disclosure.

What is claimed is:

1. A method for selective application of a primer to a substrate, comprising:

identifying, within an image frame to be printed by a printer, a priming lane where a primer is to be applied to a substrate and a non-priming lane where the primer is not to be applied to the substrate;

applying a line of molten wax to a roller, the molten wax when cooled to form a wax ridge upon the roller;

wetting with primer the roller having the formed wax ridge with the primer; and rotating the wetted roller against the substrate to apply the primer, wherein a first width of the wetted roller that does not include the wax ridge forms the priming lane upon the substrate, and wherein a second width of the roller that includes the wax ridge causes the primer to not transfer to the roller and thereby forms the non-priming lane upon the substrate.

2. The method of claim 1, wherein the width of the priming lane correlates with a width of an image to be printed by the printer within the frame, and wherein the non-priming lane correlates with a width of the frame where ink is not to be applied by the printer.

3. The method of claim 1, wherein wax is one from the set of a petroleum-based wax and an organic wax.

4. The method of claim 1, wherein the wax is solid at room temperature, and has a melting point >60° C. and <120° C.

5. The method of claim 1, wherein the line of molten wax is a first line of molten wax, the wax ridge is a first wax ridge, and image frame is a first image frame, and further comprising, after application of the primer, cleaning the roller utilizing an ultrasonic device and a cleaning solution with a PH greater than 7 to prepare the roller for applying a second line of molten wax to form a second wax ridge, the second wax ridge for selective priming of the substrate for a second image frame.

6. A method for selective application of primer to a substrate, comprising:

receiving data indicative of an image frame to be printed upon a substrate by a printer;

identifying based upon the image frame data a priming lane within the image frame wherein a primer is to be applied to the substrate by a roller;

identifying based upon the image frame data a non-priming lane within the image frame wherein the primer is not to be applied to the substrate;

causing a streak of molten wax to be applied the roller, the molten wax to cool form a wax ridge upon the roller;

applying the primer to the roller having the formed wax ridge; and applying the primer to the substrate by rotating the roller against the substrate, wherein the priming lane is formed upon the substrate using a width of the roller that does not include the wax ridge forms, and wherein the non-priming lane is formed upon the substrate as the wax ridge causes the primer to not transfer to the roller and thereby not transfer to the substrate.

7. The method of claim 6, wherein the priming lane correlates with a width of an image to be printed by the printer within the frame, and wherein the non-priming lane correlates with a width of the frame where ink is not to be applied by the printer.

8. The method of claim 6, wherein the wax ridge fills cavities in a porous surface of the roller and is hydrophobic to the primer.

9. The method of claim 6, wherein applying the streak of molten wax to the roller includes applying the wax utilizing an inkjet printhead.

10. The method of claim 6, wherein applying the streak of molten wax to the roller includes heating a tip of a solid wax element and causing the heated wax tip to touch the roller so as to form the wax ridge.

11. The method of claim 10, wherein the solid wax tip is held stationary by an application apparatus, and the roller is rotated against the wax tip to form the wax ridge along a perimeter of the roller.

12. A system to prepare a roller for selective application of primer to a substrate, comprising:

a data receipt engine, to receive data indicative of an image frame to be printed upon a substrate by a printer;

an identification engine, to identify based upon the data a priming lane within the image frame wherein a primer is to be applied to the substrate by a roller, and to identify based upon the data a non-priming lane within the image frame wherein the primer is not to be applied to the substrate;

a wax application engine, to cause a wax application apparatus to apply a line of molten wax to a roller in consideration of the data, the molten wax when cooled to form a wax ridge upon the roller in a position such that a width of the roller that does not include the wax ridge is for forming the priming lane, and wherein the wax ridge upon the roller is to cause the primer to not transfer to the substrate and thereby is to form the non-priming lane.

13. The system of claim 12, further comprising a primer application control engine 110, to cause the primer to be applied to the roller having the formed wax ridge, and to cause the primer to be applied to the substrate by rotating the roller against the substrate.

14. The system of claim 12, wherein the wax application apparatus includes a printhead for jetting the wax upon the roller as the roller is rotated about its axis.

15. The system of claim 12, wherein the wax application apparatus includes a heating element and an application tip, and the wax application apparatus is controlled to heat a tip of a solid wax element and cause the application tip to apply heated wax to the roller to form the wax ridge.

* * * * *